United States Patent [19]

Audebert et al.

[11] Patent Number: 5,297,205
[45] Date of Patent: Mar. 22, 1994

[54] PORTABLE ELECTRONIC DEVICE TO ESTABLISH PUBLIC LOYALTY TO A MEDIUM OR SIMILAR

[75] Inventors: Yves Audebert, Croissy-sur-Seine; Achille Delahaye, Chennev Ieres-sur-Marne, both of France

[73] Assignee: Adventure, Issy-les-Moulineaux, France

[21] Appl. No.: 849,064

[22] PCT Filed: Oct. 18, 1990

[86] PCT No.: PCT/FR90/00753

§ 371 Date: Apr. 23, 1992

§ 102(e) Date: Apr. 23, 1992

[87] PCT Pub. No.: WO91/06914

PCT Pub. Date: May 16, 1991

[30] Foreign Application Priority Data

Oct. 24, 1989 [FR] France .................... 89 13910

[51] Int. Cl.$^5$ .............................................. H04K 1/00
[52] U.S. Cl. .......................................... 380/23; 380/25
[58] Field of Search .................................. 380/23-25; 358/335, 908

[56] References Cited

U.S. PATENT DOCUMENTS

| | | | |
|---|---|---|---|
| 3,845,391 | 10/1974 | Crosby | 380/23 |
| 4,575,621 | 3/1986 | Dreifus | 380/23 |
| 4,599,489 | 7/1986 | Cargile | 380/23 |
| 4,750,053 | 6/1988 | Allen | 358/335 |
| 4,910,775 | 3/1990 | Yves et al. | 380/25 |
| 4,926,480 | 3/1990 | Chaum | 380/23 |
| 4,944,008 | 7/1990 | Piosenka et al. | 380/25 |
| 4,998,279 | 3/1991 | Weiss | 380/23 |
| 5,058,161 | 10/1991 | Weiss | 380/23 |
| 5,073,931 | 12/1991 | Audebert et al. | 380/23 |
| 5,136,644 | 8/1992 | Audebert et al. | 380/25 |
| 5,144,663 | 9/1992 | Kudelski et al. | 380/24 |
| 5,148,534 | 9/1992 | Comerford | 380/25 |

Primary Examiner—Salvatore Cangialosi
Attorney, Agent, or Firm—Armstrong, Westerman, Hattori, McLeland & Naughton

[57] ABSTRACT

This device validates participation of an individual in an operation where coded information on an information bearing medium must be read. It comprises: an input interface, processing means comprising means of validation on the basis of said participation, which means being adapted to prevent said validation if a variable numeric value contained in said information coincides with variable numeric values previously held in memory; at least one memory inaccessible from said input interface and managed by said processing means in order to store in memory, for a predetermined period, information representative of said variable numeric values, and input interface for outward transmission from the device of an output code X representative of participations validated by the processing means, and electric power source for the various electric circuits in the device. It applications are in televised, radio, or other games.

32 Claims, 4 Drawing Sheets

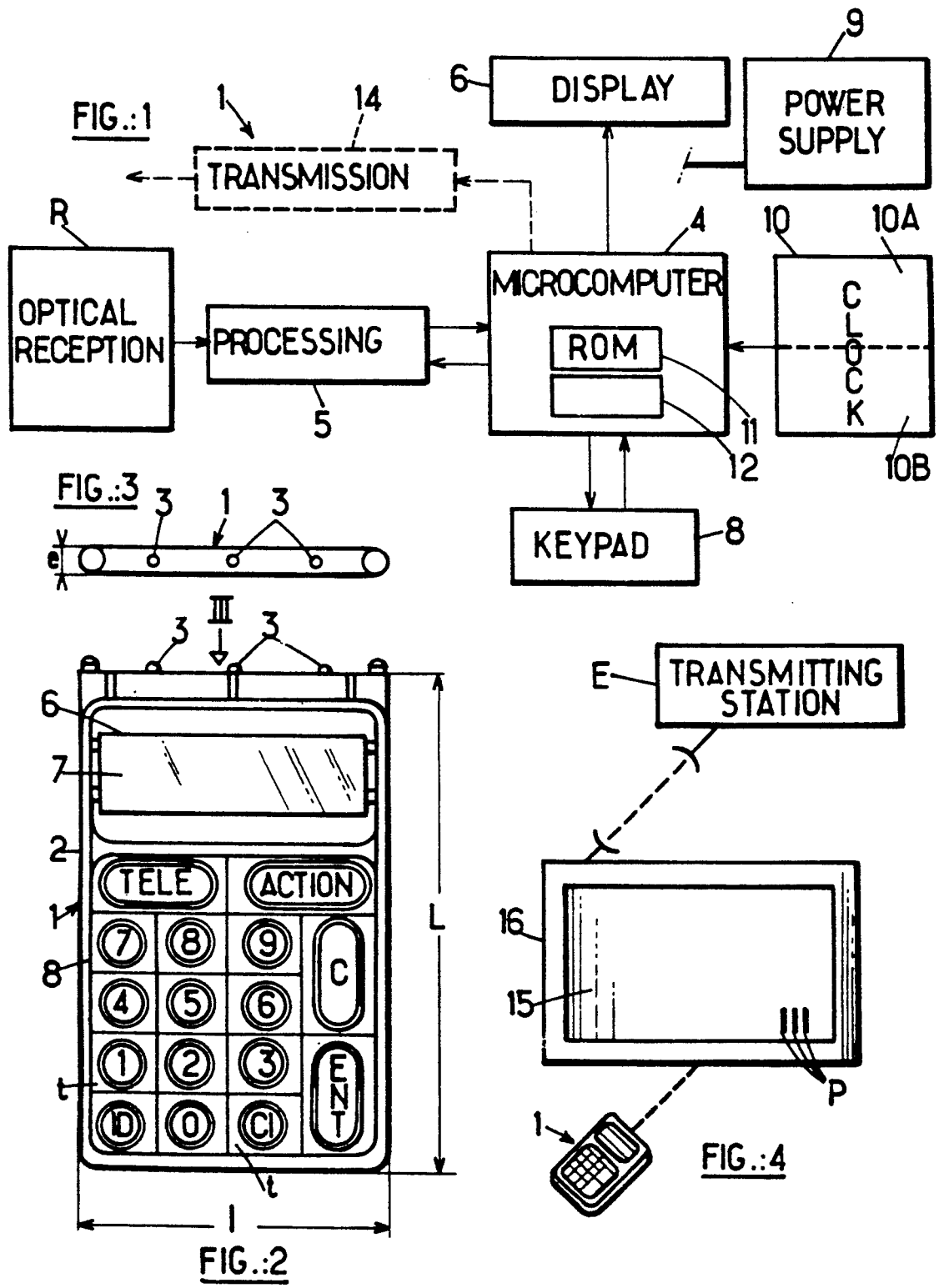

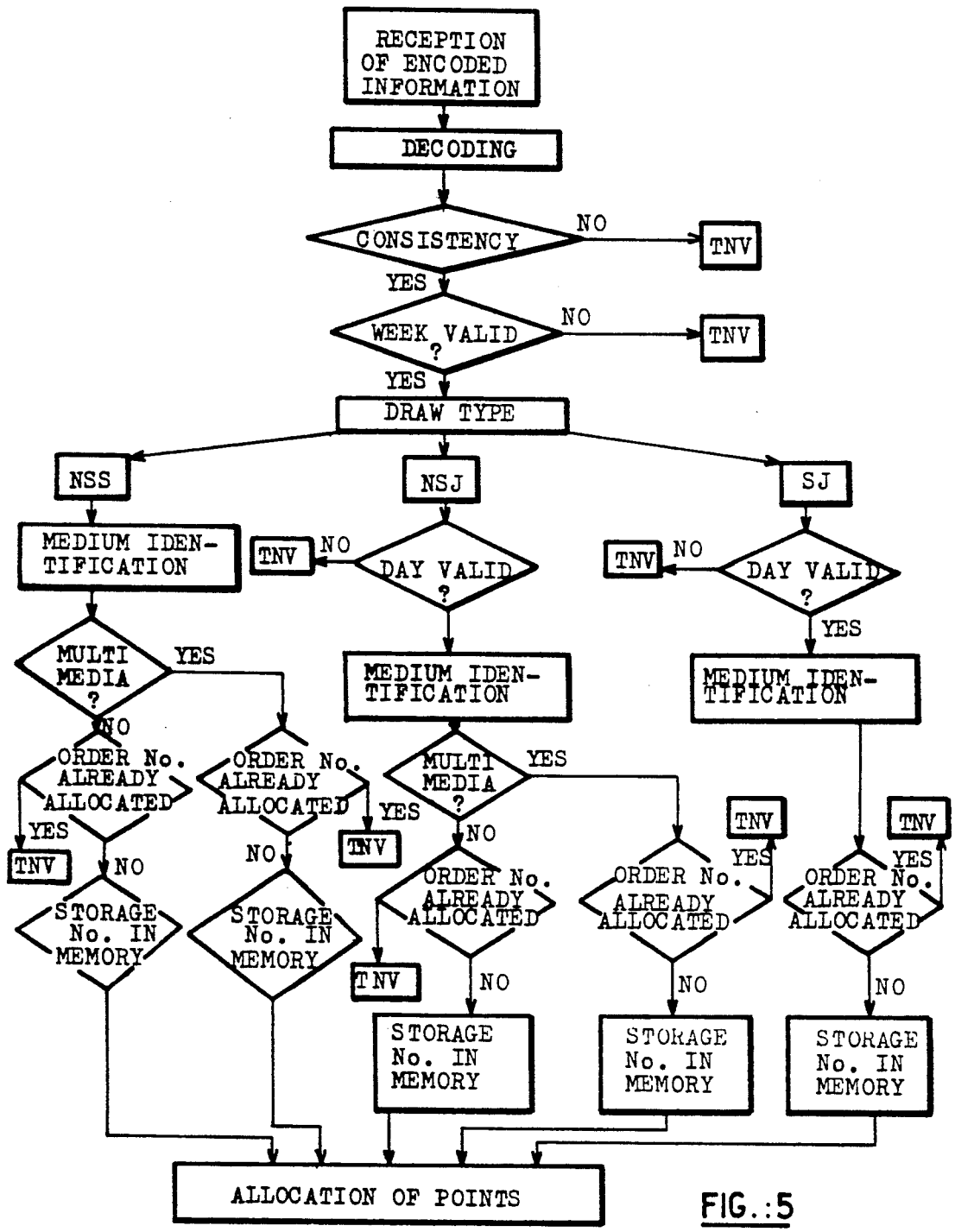
FIG.:5

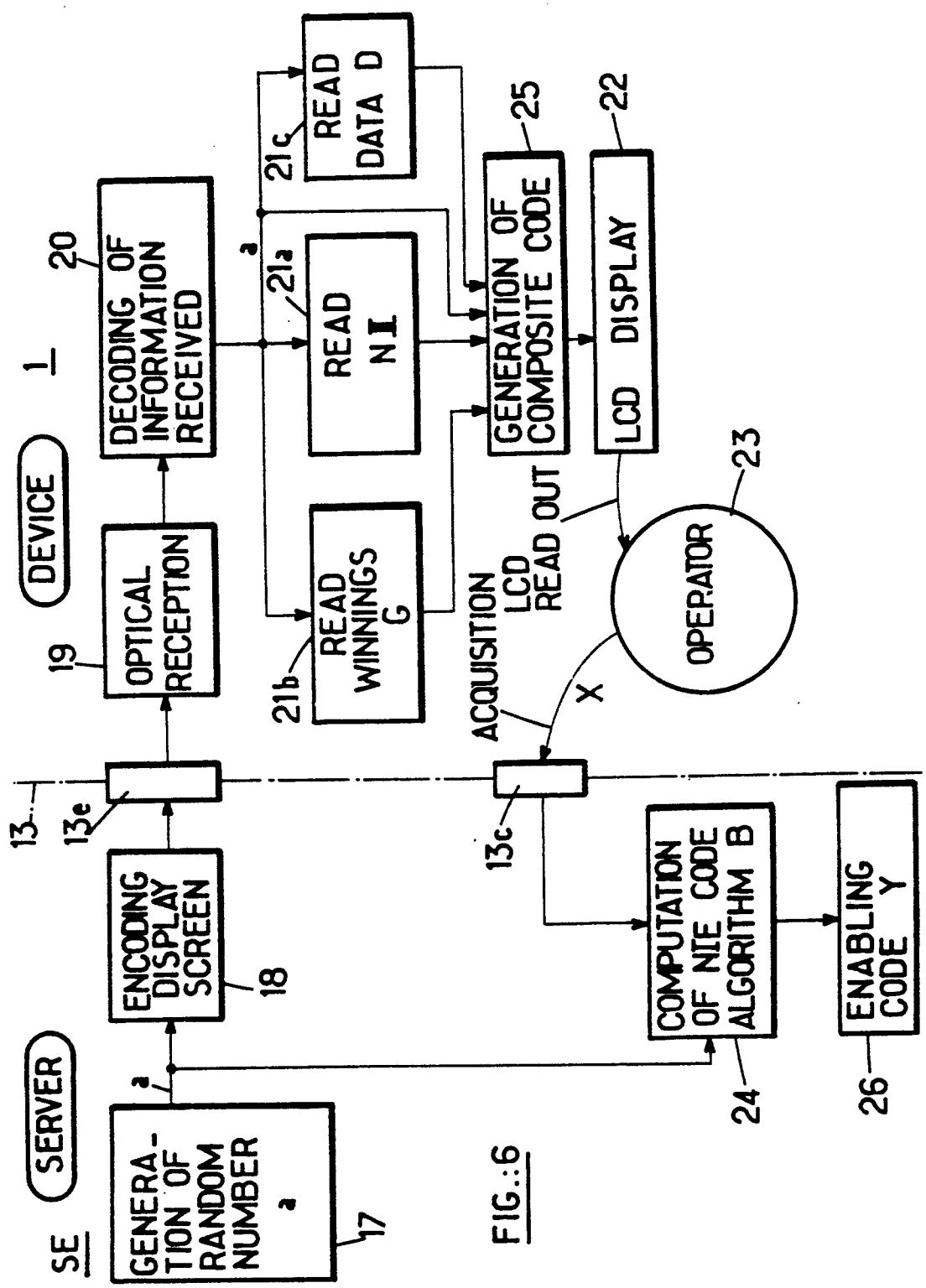
FIG.:6

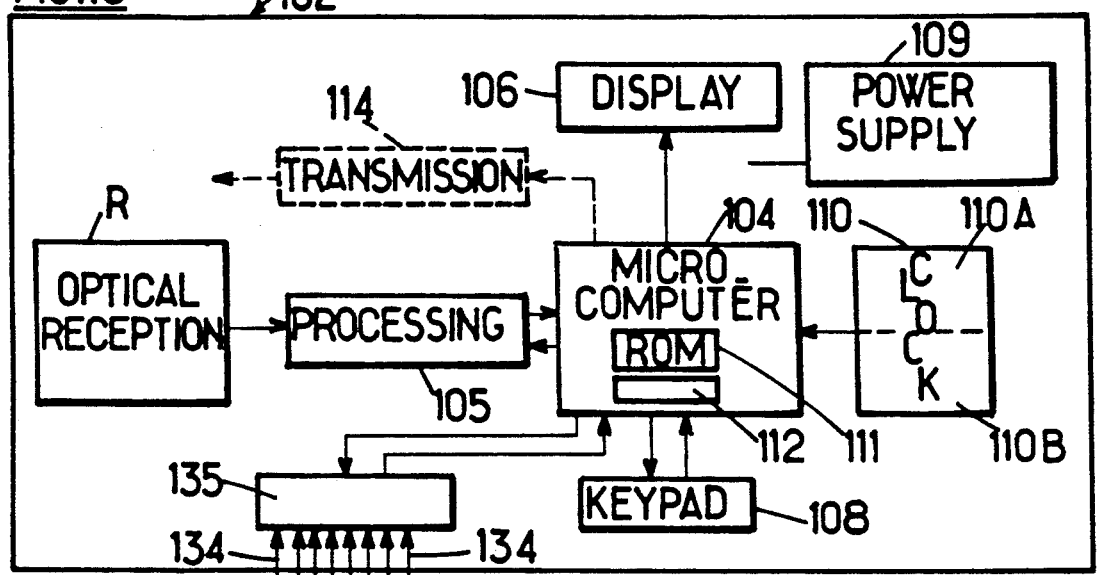
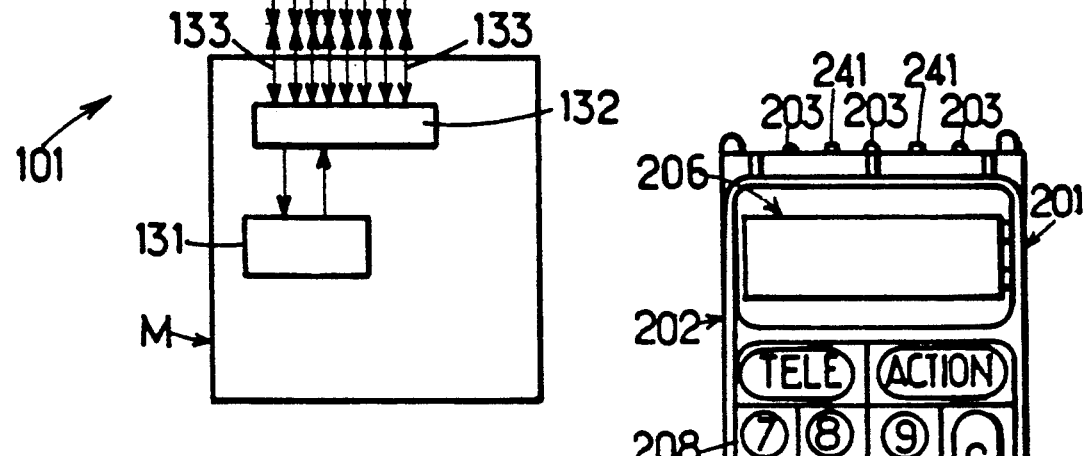
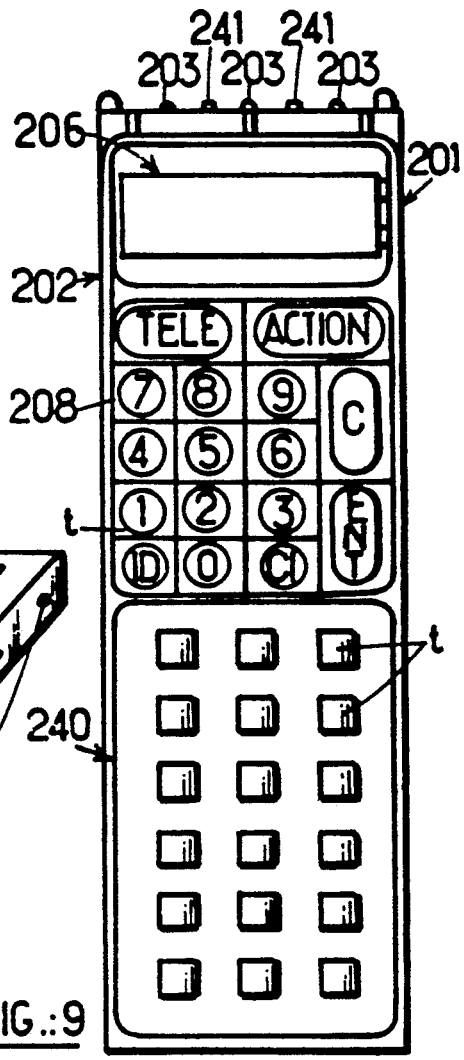
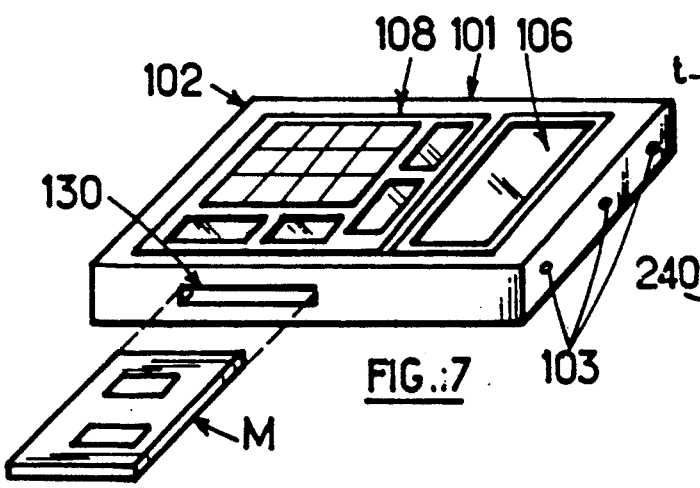

PORTABLE ELECTRONIC DEVICE TO ESTABLISH PUBLIC LOYALTY TO A MEDIUM OR SIMILAR

The invention relates to a portable electronic device allowing the implementation of operations essentially intended to establish customer or public loyalty to a medium, a service, a product, or other things.

Commercial or similar operations intending to establish customer or public loyalty by allocation of winnings (prize in kind or in cash, price reduction on a product or a service, etc . . . ) as a reward for that loyalty are extremely widespread. These operations can assume the most various forms and their methods are generally specific to each operation. Because of this they are costly, limited in time, relatively inappropriate to a system involving several partners and their impact cannot always be measured accurately.

The problem of establishing public loyalty is particularly crucial in the field of the press, radio, television and other media for which a significant proportion of their resources arises from publicity, sponsorship or similar.

The purpose of the invention is to provide a portable electronic device which offers new possibilities for the use of operations to establish customer or public loyalty involving the use by the customers or the public of renewable information which is made available to them on suitable information media (press, radio, television, various placarding, etc . . . )

For this purpose, the subject of the invention is a portable electronic device for validating the participation of an individual in at least one operation using a medium involving the use by the said individual of at least one encoded item of information supplied by at least one medium characterised in that it comprises:

at least one input interface to allow the entering of the said encoded information into the device by the individual, at least one memory which is inaccessible from the said input interface means of processing the said information comprising:
means of decoding the said information,
means of extracting a variable numerical value from the said decoded information,
means of comparing the said variable numerical value with variable numerical values previously stored in the memory,
means of conditional validation of the said participation as a function of the said decoded information, the said means being adapted to prohibit the validation of the said participation if the said variable numerical value coincides with one of the said previously stored variable numerical values, otherwise to validate the said participation and to store the said decoded variable numerical value in the memory,
means of storage, during a predetermined period of time, of the said variable numerical values,
an output interface to transmit to the exterior of the device an output code representative of participation validated by the means of processing, and
an electrical power supply source for the various electronic circuits of the device.

Preferably, the said decoded information comprises a dating datum and the said means of processing are adapted not to take account of the said participation when the said dating datum is representative of a date prior to a reference date contained in the device and to delete from the said memory, at each change of the said reference date, the said information representative of previously stored variable numerical values.

According to a first embodiment of the invention, the said reference date is constituted by the most recent dating datum associated with a previously stored numerical value and the validation means are adapted to validate the said participation if the decoded dating datum is identical to or later than the said reference date.

Preferably, the said numerical value is an order number and the said means of processing are adapted to validate the said participation if, in the case of an identical date, the decoded order number and the last order number stored comply with an order relationship stored in the device.

Thus the users will only be able to enter information into their device in the chronological order desired by the distributor of that information. Preferably, provision is made that, for a given period (date), the users can only be rewarded for their participation if they carry out the necessary procedure within a predetermined period. In order to do this, the means of processing are programmed to transmit an output code which is representative only of participations which are validated at the most recent stored date. This date appears in encoded form in the output code, which ensures a certification of the winnings obtained with the device. The amount of these winnings can be the sum of a number of points obtained for each validation and/or can be calculated by the means of processing as a function, for example, of the number of validated participations for a given date, and also appears in encoded form in the output code.

In other words, the user of a device will see each of his participations validated on condition that the encoded information is entered into the device in the prescribed order, this order being made known to users by appropriate means (placarding, advertisements, etc . . . ) which are not part of the present invention. The risk of fraud is relatively low because a user who seeks to enter random information systematically into his device for the purpose of cracking the encoding methods used could not hope to win more than a user who is taking part in all of the "draws".

However, it is necessary to ensure that a user will not be able to win by entering the same encoded information several times. The device must therefore be capable of keeping track of the numerical values which have previously been validated. If the encoded information which is broadcast does not contain any dating data, the device must store all of the numerical values. This results in the use of memories of very high capacity if it is desired that it should be possible to use the device over long periods (several months to several years). The cost of the device can be prohibitively increased because of this.

The device according to the first embodiment of the invention allows a considerable reduction in the memory capacity necessary because the means of processing are adapted to store only the set of numerical values associated with the current date and the code representative of this date, any numerical value associated with a prior date being rejected by the device. However, there still remains a non-negligible risk of the device being rendered almost inoperative by the accidental entry of a random item of encoded information which would be taken into account by the means of processing and would include a dating datum much later than the current date. Furthermore, in such a configuration, security requires that the output code should include the date at which the winnings were obtained and, consequently, that the winnings should be erased at each entry of an item of encoded information bearing a new date. The user must therefore be credited with his winnings with an authorised organisation before each change of date, which substantially limits the possibilities of exploitation of the device.

In order to overcome these disadvantages, according to a second preferred embodiment of the invention, the device comprises a clock coupled to the means of processing in order to supply an absolute reference date, the means of processing being adapted to authorise the said comparison of the decoded variable numerical value with the previously stored variable numerical values when there is coincidence between the dating datum and the absolute reference date. Thus, the device only requires a memory capacity limited to the maximum number of items of information capable of being entered into the device over a given period (date) and the latter is furthermore protected from the taking into account and validation of information which would bear a date later than the current date.

According to another characteristic of the invention, the said memory comprises at least one memory unit forming a table whose memory locations, in each of which an item of information representative of a numerical value is capable of being stored, have as addresses the numerical values capable of being contained in the encoded information distributed on the said information medium. This solution minimises the size of the memory necessary for storing, over a given period (date), the numerical values entered into the device.

According to another characteristic, the said memory comprises several memory units which are selectively addressable by the said means of processing as a function of the degree of resolution (day, week, etc . . . ) of the said dating datum.

According to another characteristic, the memory comprises several memory units selectively addressable by the said means of processing as a function of an order datum contained in the said encoded information and representative of the presence or absence of a condition relating to the order of entry of the said encoded information into the device. In this way the memory can comprise at least a first memory unit whose memory locations are directly addressable in response to the detection of an order datum representative of an absence of the said condition, and at least one second memory unit addressable according to a predetermined addressing sequence in response to the detection of a datum representative of a condition relating to the order of entry of the said encoded information. Preferably, the second memory unit is a register adapted to store a new order number only if its value is greater than that of the order number which is stored in it.

According to yet another characteristic, the memory comprises several memory units selectively addressable by the said means of processing as a function of a datum of the said encoded information which is representative of the nature of the medium of the said encoded information.

Preferably, the means of processing comprise at least one winnings counter which is incremented at each validation of a participation. The means of processing can be adapted to increment the winnings counter by a quantity depending on a winnings datum contained in the said encoded information. As a variant, or in combination, the means of processing can be adapted to increment the winnings counter by a quantity which is calculated, according to a predetermined law stored in the said device, as a function of one or more other data contained in the decoded information and/or the information stored temporarily or permanently in the device.

Preferably, the means of processing also comprise means of error checking and/or consistency checking in order to check the said encoded information as a function of at least one check code contained in the said information.

The means of processing can also comprise means for processing, according to a predetermined rule, as a function of at least one secret datum stored in the device, a random datum entered into the device, and for storing an item of information representative of the result of the said processing. This characteristic allows the carrying out of a lottery which, for example, will be reserved only for those users who will have complied with certain criteria, for example those who will have entered into their device all of the encoded information which will have been made available to them over a given period (date). The draw will be able to result, for example, from a processing according to a predetermined law of the random datum as a function of an internal identification number stored permanently in the device. Users having won in this lottery will thus be able to benefit from bigger prizes (major prizes).

According to another characteristic of the invention, the means of processing comprise means of debiting and authenticating, in association with an authorised organisation, winnings taken into account in the device, the said debiting and authenticating means being adapted to supply a composite output code by encoding, according to a first given algorithm as a function of an external item of control information comprising a random number and supplied from the said server, the said debited winnings, the said reference date and an identification code peculiar to the device and stored in storage means, the said authorised organisation being adapted to carry out, by means of the said random number, according to a second algorithm correlated with the first algorithm, a computation on the said composite output code in order to decode the said winnings and to compute an external identification code, the said winnings being authenticated when there is consistency between the said external identification code and an item of check information known to the server and when the said reference date is valid. Preferably, the said control information comprises the amount of the winnings that the user wishes to have debited from his device and the means of processing comprise means of comparing the winnings stored in the said counter with the winnings to be debited and of decrementing the said counter as a function of the result of the said comparison.

According to a particular embodiment of the invention, a winnings counter is associated with each medium of the said encoded information and the said control information comprises a datum representative of the said medium, the said winnings being that taken into account in the counter identified by the said datum.

According to one characteristic the means of processing comprise means of inhibiting the validation means in response to the delivery of the said composite output code and of making the said validation means operational and debiting the said winnings counter in response to the entry into the said device of an enabling code supplied by the said server when the said winnings are authenticated.

The input interface of the device can be constituted from one or more means such as a numeric or alphanumeric keypad, optical receiving means for reading the said encoded information from a display screen, or bar code reading means.

The output interface can be constituted by a simple display screen, for example a liquid crystal display screen. However, the device may also comprise means of transmission of any appropriate type, whether this be optical, electrical, radio, acoustic or of other type, with or without removable hardware connection with the server, in order to transmit the previously mentioned composite code to the server.

Preferably, the said memory for storing information representative of the said numerical values is random access memory and the means of processing are constituted by a programmed microcomputer. According to a preferred embodiment, the microcomputer, its random access memories and read only memories and their interface buses are produced on the same semiconductor chip according to the so-called "monochip" technology.

Other characteristics and advantages of the invention will emerge from the following description of an embodiment illustrated by the appended drawings in which:

FIG. 1 is a simplified block diagram of a portable electronic device according to a first embodiment of the invention.

FIG. 2 is a plan view of the casing of the device of FIG. 1.

FIG. 3 is a view in the direction of the arrow III, in FIG. 2.

FIG. 4 is a diagram showing the use of the device according to the invention in association with a television receiver set.

FIG. 5 is a functional diagram showing the implementation of games or similar things by means of the device according to the invention.

FIG. 6 is a block diagram showing the function of authentication of winnings which is carried out with the device of the invention.

FIG. 7 is a diagrammatic perspective view of a portable electronic device according to a second embodiment of the invention.

FIG. 8 is a simplified block diagram of the device of FIG. 7.

FIG. 9 is a plan view of the casing of a portable electronic device according to a third embodiment of the invention.

Referring to the drawings, particularly to FIGS. 1 to 3, it is possible to see a portable electronic device 1 allowing the implementation of operations essentially intended to establish customer or public loyalty to a medium, service, product or other things.

In the rest of the description, the term "game" will refer to the use which is thus made of the device.

A device of similar structure is described in detail in the French patent applications 2 630 561 and 89 06848 to which reference can be made. This device comprises an outer casing 2 of rectangular parallelepipedic shape, preferably made of plastic material, and whose thickness e (FIG. 3) is small compared with its width 1, and its length L. Preferably, the size of the casing is adapted so that the latter can be held in one hand.

The device comprises optical receiving means R advantageously constituted by phototransistors 3 (FIGS. 2 and 3) disposed on the edge of the small side of the casing 2, and in particular in alignment. In the considered example, the phototransistors are three in number.

As a variant, or in addition to the phototransistors intended to read information on a video screen, the device 1 may be equipped with a conventional bar code reader. This type of reader is perfectly conventional and has not been shown in the drawing. In the rest of the description, it will therefore be assumed, unless otherwise prescribed, that the optical receiving means R indifferently denote the previously mentioned system of three phototransistors 3 or the bar code reader.

The receiving means R, as shown in FIG. 1, are connected to a microcomputer 4 by the intermediary of an adapter circuit 5. As the receiving means is a system of three phototransistors, the adapter circuit 5 is adapted to carry out, as described in the previously mentioned French patent application 2 630 561, a self-adapting to a terminal screen or television receiver screen.

The device 1 comprises a display 6, preferably a liquid crystal display (LCD) forming a rectangular screen (FIG. 2 on the casing). Preferably, this screen 7 is provided to display eight aligned alphanumeric characters. The display 6 allows the display of information coming from the microcomputer.

An electrical power source 9, generally constituted by a small-sized electric battery, is provided to supply the various circuits. Preferably, this battery is embedded in the casing during the manufacture of the device in such a way that it is rendered inaccessible and to prevent its replacement and any access to the power supply conductors of the various electronic circuits of the device, which are also embedded in the casing 2.

The device furthermore comprises a keypad 8 constituted in particular, as shown in FIG. 2, by keys t of which ten correspond to the digits 0 to 9 respectively. The keypad 8 is completed by a certain number of function keys, namely:

a "TELE" key which allows the change into optical mode for the remote loading of an item of encoded information from a screen; as a variant, this key may be eliminated if the microcomputer 4 is programmed to be actuated by interrupts coming from the optical receiving R and processing 5 means;

a "C" key which allows an incorrect data entry to be cancelled;

an "ENT" key which allows a data entry to be accepted;

an "ACTION" key which allows a change into game mode, for the implementation of games not requiring the reception of data by the means R;

a "CL" key which allows the winnings achieved with the device to be displayed on the screen;

an "ID" key which allows a change into identification mode if the device is equipped with this function and allows the implementation of a manual certification and authentication procedure.

The microcomputer 4 is a masked microcomputer, produced in CMOS technology. It can be of the MOTOROLA MC68HC05B6 type for a self-programmable microcomputer version, or of the MEC 75308 type for a RAM storage memory version, or of the specific circuit (ASIC) type for a protected RAM version. The specific circuit will be developed from a standard microcomputer of the preceding types in which memory protection means will be included. It will be possible for these protection means to be constituted by a fuse which is blown after the memory is written.

The microcomputer comprises a read only memory (ROM) 11 and a storage memory 12. The read only memory 11 is organised into two zones, namely:

a program zone in which are stored the instructions relating to:
- the optical receiving and decoding function;
- the possible identification function;
- the authentication function;
- the function of personalisation of the device;
- the application functions allowing the implementation of the games which will be described below;

and a manufacturing zone for storing information relating to the manufacture of the device and for initialising the product, this information concerning:
- the customer code, it being understood that the customer does not denote the final user;
- the number of the mask used for the microcomputer;
- the manufacturing key, in particular constituted by 128 bits, allowing control of the personalisation.

The storage memory 12 of the device contains two categories of data, namely:

operating data for the storage of information relating to the games and/or bets implemented with the device, or other applications if the read only memory is programmed for this purpose; and personalisation data containing information relating to:
- the confidential code, if the identification function is programmed in read only memory;
- the secret authentication key;
- the operating parameters (for example inhibition of the card after four failed attempts at identification);
- the various secret decoding key or keys necessary to implement games by means of the device;
- the authorised service life of the device.

The storage memory 12 may be a PROX or an EE-PROM, or, advantageously, a RAM backed up by the supply source. The RAM memory is inaccessible from outside the device and any attempt at access causes the erasure of the information written in it and renders the device inoperative. The personalisation data are stored in it once and for all; the operating data can be changed. The protection of the personalisation data in RAM memory 12 results simply from the structured programming of the microcomputer 4.

The data bus and the address bus (not shown in the drawings) of the microcomputer 4 are not accessible from outside, in order to render it impossible to carry out a reading or a fraudulent modification, from the outside, of the information contained in the read only memory 11 and the storage memory 12 of the device 1.

If the microcomputer 4 is programmed to provide an identification function, the device can only be rendered active after operating the ID key and entering, on the keypad 8, a confidential PIN code identifying the user of the device. This confidential code is known only to the holder of the device 1. The program stored in the memory 11 can furthermore be provided to inhibit the device 1 after the consecutive input of a certain number of incorrect confidential codes on the keypad 8, for example four codes. The device 1 then becomes useless and the re-actuating of the device can only be provided by means of a special procedure, for example in a server centre.

Optionally, the device 1 can be provided with means 14 of transmission of data to the exterior, in particular to a server, for the purpose of authentication and of allocation to the user of the device of winnings which he has obtained with that device. These transmission means can be of optical, electric, radio, acoustic or other type and can assume any appropriate form known to those skilled in the art. As a variant, the transmission of data to the exterior of the device can be provided by the reading of information displayed on the display 6 by means of a device specially adapted for this purpose, for example a device such as described in the French patent application 89 10201.

Apart from the system clock (not shown) peculiar to the microcomputer 4, the device 1 is also provided with a clock 10. This clock can be constituted for example by a timebase 10A and a counter 10B permanently supplied by the power supply source 9. Each time its contents overflow, that is to say at regular intervals, the counter 10B sends an alarm pulse to the microcomputer 4. The latter increments the time elapsed since the personalisation of the device and then returns to the standby state until the appearance of the next pulse from the counter 10B. When the authorised service life of the device has elapsed, this information being stored in the memory 12 during the personalisation of the device, the microcomputer 4 is programmed to inhibit automatically the functioning of the device 1, for example by erasing the content of the personalisation data in the memory 12.

The clock 10 also has the function of supplying the microcomputer 4 with an absolute reference date, namely the day and week in progress, which are represented by numerical codes. The current date codes are stored in the memory 12 during the personalisation of the device and are then updated as described above. The code S for the week changes each week according to a predetermined law, while the code i for the day is cyclic. Knowledge of an absolute reference date allows the microcomputer 4 to validate the participation of an individual in a draw, this term being defined below.

This absolute reference date can also be used during the winnings authentication procedure, which will be described below.

The device which has just been described is intended to allow its user to participate in games by entering into this device encoded information made available to him in the press, by television, by radio, on publicity placards, on products displayed at points of sale, etc . . . . In the following text, these various media will be called media, a "multi-media" game denoting a game which calls for the reading of encoded information on several media of different types.

The implementation of games by means of the device according to the invention will now be described with reference also to FIG. 5. In the rest of the description, the operation consisting in entering an item of encoded information such as a number into the device, which information will be validated or not validated subsequently and will possibly give rise to a computation of winnings, will be called a "draw". This draw concept does not imply an intervention of chance: any user entering in his device an item of encoded information which is supplied to him for this purpose by a medium will have his participation in the game validated and winnings will possibly be allocated to him. However, in a particular embodiment of the invention, when the user has complied with certain conditions (participation in a minimum number of draws for example), the microcomputer is programmed to process an arbitrary item of information of given format entered by the user, thus allowing selection of users who will be able to benefit from rewards or winnings bigger than those to which they are entitled simply by their participation.

In order to participate in organised games and to carry out draws, in the sense of the word which excludes any intervention of chance, the user must simply look at the television, listen to the radio, read certain newspapers, etc . . . , over defined periods (day, week), and enter encoded information supplied by these media into his device.

The keypad allows the user to enter an item of information read from or heard on any medium (television, radio newspaper, magazine, placard, articles for sale in a shop, etc . . . ). The optical receiving means formed from phototransistors allow the optical reading of encoded information on a video screen of the television or data communications type, or on another monitor accessible to the public. This information is for example transmitted by a transmitting station E, to a television receiver 16 and is displayed on the screen 15 of the latter in the form of luminous bars P (FIG. 4) and it is remote loaded into the device 1 by operating the "TELE" key while placing the phototransistors 3 against the luminous bars. This method of remote loading has been described in the French patent application 2 630 561 to which reference can be made. Finally, the bar code reader allows the reading of information printed in a newspaper, a magazine, articles for sale in a shop, etc . . . .

The encoded information made available to users on these different media comprise a predefined format and a certain number of fields capable of being recognised by the device. The encoding of the information can make use of numerous mathematical methods well known to encoding specialists.

The encoded information entered by the intermediary of the user interface is applied to the microcomputer 4 in the form of a binary number, after processing and/or conversion by appropriate conventional means if it appears in another form, for example in numerical or alphanumerical form for entry on the keypad. The microcomputer 4, which is programmed in a conventional manner for this purpose, then decodes the information using the secret decoding key or keys stored in the memory 12.

The microcomputer 4 then examines if the decoded message is consistent by means of a consistency check code CCC contained in this message. This CCC code allows verification that the received information is not simply a sequence of digits chosen at random. The methods allowing the checking of the consistency of messages are extremely conventional, for example in the field of data processing and telecommunications, and there is no need to give a detailed description here. If the message is declared inconsistent by the microcomputer 4, it is rejected and the draw is not valid.

In the opposite case, the code representative of the week contained in the decoded message is compared with the code S of the week in progress generated by the microcomputer 4 in association with the clock 10. If the codes do not coincide, the draw is rejected.

If the week codes coincide, the microcomputer 4 determines what type of draw is concerned. In the present embodiment, the draws are distinguished according to whether or not information must be entered into the device in the order of its appearance on the media and according to the duration of the period during which the information supplied to the user can be entered into the device. However, other criteria for distinguishing draws can naturally be used.

In the example of FIG. 5, there are three types of draw:

the "non-sequenced week" NSS draw signifies that the encoded information relating to this type of draw may be entered in any order during a given week. This type of draw is preferably associated with distribution or commerce;

the "non-sequenced day" NSJ draw signifies that the encoded information relating to this type of draw may be entered into the device in any order during a given day. This type of draw is preferably associated with the press; and the "sequenced day" SJ draw signifies that the encoded items of information relating to this type of draw must be entered into the device in the order in which they are provided to the users, and this must be done during a given day. This latter type of draw is preferably reserved for the audiovisual media (radio, television, data communications).

If, in the decoded information, the draw code corresponds to a non-sequenced week NSS draw, the microcomputer 4 identifies in this information the nature of the medium which carried the encoded information. The microcomputer then determines, by means of another code in the decoded information, if the draw is of the "multi-media" type or not. A draw is of the multi-media type if it requires that the user's winnings depend on the user entering encoded information coming from several media of different types.

In the negative, the microcomputer compares an order number contained in the decoded information with the order numbers previously stored, for the week in progress, in a table of the memory 12 containing all of the order numbers of the encoded items of information entered into the device since the start of the week in progress, whatever the type of media having distributed these items of information may be. As the maximum number of order numbers capable of being transmitted and stored during a given period (day, week) is known, this number is that of the memory locations in the table and these locations have the different possible order numbers as their addresses. This configuration allows a minimising of the memory capacity necessary for storing the order numbers. The contents of this table are erased by the microcomputer 4 at each change of week.

If the order number has not yet been allocated, it is stored in memory and the microcomputer 4 increments a winnings counter by a certain number of points. This number of points is contained in encoded form in the decoded information but, as a variant, it could be computed as a function of the decoded information on the basis of one or more criteria such as the type of medium, the week number, etc . . . .

Assuming that the draw would be of the non-sequenced week and multi-media type, the microcomputer compares the order number with the contents of a table allocated to the medium which has been identified. There is therefore, in this case, a table of order numbers for each of the media of the multi-media draw. As in the preceding case, the draw is not validated if the order number contained in the decoded information has already been stored in the table (the contents of this table are also erased at each change of week). If such is not the case, the new order number is stored in the table. The consecutive winnings in multi-media draws will be taken into account in the winnings counter and the effective participation in draws coming from several different media will have the effect of increasing these winnings according to the rules programmed in the microcomputer. The winnings obtained by a user at the end of a multimedia draw will depend, for example, on the number of draws carried out for each medium, according to criteria whose detailed description is not within the scope of the present invention.

If the identified draw is of the non-sequenced day NSJ type, the microcomputer checks if the day code of the decoded information corresponds to the code J of the day in progress according to the clock of the device. In the negative, the draw is not validated. If the day is validated, the check procedure is carried out, starting from the identification of the medium, in the same way as that described with reference to the non-sequenced week draw. If the non-sequenced day draw NSJ, whether or not of the multi-media type, is validated, the points obtained are incremented in the winnings counter as described before with respect to the non-sequenced week draw. The table or tables storing the order numbers are in this case erased at each change of day.

Finally, in the case of a sequenced day SJ draw, the microcomputer 4 starts by determining if the day code of the decoded information received is valid. In the negative, the draw is refused and, in the affirmative, the microcomputer proceeds with the identification of the medium and then compares the order number of the decoded information received with the order numbers already stored in a table allocated to the identified medium. The contents of this table are erased at each change of day. The draw is rejected if the order number received is less than or equal to the last number stored in the table. In the opposite case, the winnings counter is incremented by a number of points determined as described previously.

The result of the above is that a user has his participation in a draw validated and winnings are allocated to him each time he enters an item of encoded information into his device under the prescribed conditions, the obtaining of minimum winnings being able, as a variant, to be subordinated to the entering of information coming from several different media in the case of a multimedia draw.

The existence of an absolute reference date generated in the device and the storage in the latter of order numbers corresponding to the encoded information entered successively during the reference date prohibit a user from gaining points by entering the same encoded information into his device several times. The corresponding tables are of course reset to zero at each change of date (day and week) in order to authorise draws during the next period. In order to take account of possible differences between the clocks of the devices, the latter are neutralised, at each change of date, during a time computed according to the spread of the differences over the entire service life of the devices. The latter is limited to a predetermined value, 128 weeks for example, by programming the microcomputer 4.

At a time determined or chosen by the user, for example when the winnings counter has reached a predetermined number of points, its user can have his device debited by all or some of the points acquired and can have these points credited at an authorised organisation, which will give him the right to a reward (prize, reduction on articles or services, etc . . . )

This procedure allowing the user to see a certain number of points credited at the authorised organisation and the winnings counter of his device debited by the corresponding number of points will be called the debit and authenticating procedure in the rest of the description. The authenticating procedure is similar to that described in the French patent application 89 06848 to which reference can be made for fuller details.

FIG. 6 is a functional diagram showing the debit and authentication function implemented by optical means. The left hand part of this figure corresponds to the communications automaton of a server SE. The part to the right of the dotted and dashed line (which represents a terminal 13 of the server SE) corresponds to the device 1.

Block 17 corresponds to the generation by the server SE of an item of control information comprising the number of points which the user wishes to have debited from his device and a random number a. Block 18 corresponds to the encoding and to the display of this number on the screen 13e of the terminal. Block 19 corresponds to the optical reception of data by the phototransistors 3 of the device 1. Block 20 corresponds to the decoding, by the microcomputer 4, of the received data. Blocks 21a, 21b and 21c correspond to the reading by the microcomputer 4 of an internal identification number NII of the device, of the winnings G and of the date D respectively. Block 21b also corresponds to the comparison of the winnings G stored in the counter and the number of points which the user wishes to have debited. If G is greater than the number of points requested, this number is taken into account. In the opposite case, either the procedure can be interrupted, or the contents of the winnings counter G are taken into account.

Block 25 corresponds to the computation by the microcomputer 4 of a composite code X from the code NII, from the number of points debited, from the date D contained in the device and from the received random number a, according to an algorithm A. Block 22 corresponds to the display on the screen 7 of the device 1 of the composite code x computed in 25. From this moment, the device 1 is inhibited and can no longer be used for new draws as long as it has not been enabled.

The user, represented by a circle 23, after reading from the screen 7, enters the code X displayed on the screen 7 on the keypad 13c of the terminal 13.

Block 24 corresponds, in the server S, to a computation carried out, using the random number a and according to an algorithm B correlated with the algorithm A, on the composite code X in order to decode the number of points debited and the date D and to compute an external identification code NIE, the said number being validated when the date D is correct and when there is consistency between the external identification code NIE and check information known to the server. If the algorithm B is symmetrical with the algorithm A, the codes NIE and NII are equal when there is consistency.

If consistency is established, the number of points thus validated is credited by the server to the holder of the device, this holder being identified, for example, by the code NIE. When there is no consistency, the result is not allocated.

Consistency can be established, for example, by processing on the code NIE, as a function of predetermined encoding rules, and/or by correlation of the code NIE with an item of external information entered by the user into the server, for example the serial number of the card, the user's name, a password, etc . . . .

Block 26 corresponds to the display on the terminal of the server SE of a code Y for enabling the device 1. The server SE issues this code if the authentication has been positive. The user enters it by means of the keypad 8 of his device, which has the effect of enabling it and debiting the winnings counter by the number of points credited in the server. The device then displays a message on the screen 7 informing the user that it is ready to be used again.

If the device 1 is not equipped with optical receiving means using phototransistors, the authentication procedure can be carried out by telephone. The user calls the server by telephone and, after making contact with an operator, states the serial number of his device which is clearly indicated on that device and states the number of points to be debited. The operator gives him the control information which she reads on the screen of the authenticating data processing system (server). The player enters this control information into his device and in return obtains the alphanumeric code X on the display of the device.

The user reads the code X on the screen 7 and gives it to the operator who types it in on the keypad of the authenticating data processing system. The latter indicates to the operator whether or not the card and the winnings are authenticated and then, in the event of positive authentication, supplies the enabling code Y. The operator relates this enabling code Y to the user who enters it into his device. The effect of this code Y is to enable the device and to debit the winnings counter by the number of points chosen by the user. The device then displays a message informing the user that it is ready to be used again.

As a variant, the device 1 can comprise a winnings counter associated with each medium. In this case, during the debit and authentication procedure, the user indicates the type of medium for which he wishes to be debited a certain number of points. This allows the authorised organisation to measure the loyalty for each type of medium.

According to a second embodiment of the invention shown in FIGS. 7 and 8 (in which the reference numbers from FIGS. 1 to 6, increased by 100, denote corresponding elements), the portable electronic device 101 is split into two subassemblies, namely the casing 102 whose various components are electrically supplied by the power supply source 109, and a removable subassembly M which does not have its own power supply source, such as a microcircuit card, which can be inserted in a slot 130 in the casing 102 in order to make an electrical connection with the components of the latter.

According to this second embodiment, the protected memory intended to store the various variable numerical values and the winnings of the user is moved into the subassembly M. This memory 131 is therefore a programmable read only memory which is read and/or write protected by means which are conventional in the field of microcircuit cards. The memory 131 is connected by the intermediary of an interface circuit 132 to a certain number of electrical contacts 133 capable of establishing an electrical connection with the electrical contacts 134 of the casing 102 when the subassembly M is suitably engaged in the slot 130. The electrical contacts 134 are connected by the intermediary of an interface circuit 135 to the microcomputer 104 and to the electrical power supply source 109 in order to ensure the electrical power supply of the memory 131 and the reading and/or writing of data in the latter from the microcomputer 104.

Once the subassembly M is inserted in the casing 102, the functioning of the assembly is identical to that described with reference to the first embodiment shown in FIGS. 1 to 6. Because of the particularly small dimensions which the subassembly M can have (preferably it has the format of a standard credit card), the user can keep it with him permanently and take part in draws at any place where a casing 102 is available to him. The user will be able to have the winnings stored in his subassembly M credited in an appropriate terminal, for example when all of the capacity of the memory 131 has been used and the subassembly will have become useless.

As a variant, the means of processing capable of decoding the numerical information, of extracting the variable numerical value from it, of comparing it with the previously stored values and of validating or not validating the participation may also be moved totally or partially into the subassembly M. Preferably, the means of processing thus moved are constituted by a microcomputer (not shown) connected between the interface circuit 132 and the memory 131.

According to a third embodiment of the invention shown in FIG. 9, the portable electronic device 201 is combined with a remote control device for a television set and/or with another device for gaining access to a medium. The single casing 202 thus groups the keypad 208 which is identical to the keypad 8 in FIG. 2, a conventional remote control keypad 240 comprising a certain number of function keys t and a display 206 common to the "participation" and "remote control" applications. Preferably, the microcomputer 4 is programmed to implement both of these applications and to control the transmitting units 241 (for example light emitting diodes) of the remote control, placed on the front edge of the casing 202, just like the phototransistors 203.

The combining of the participation device in a common casing with a remote control device increases its ease of use during television transmissions.

The second and third embodiments can furthermore be combined by moving the functions of storing variable numerical values and winnings and, possibly, of processing data as described with reference to FIGS. 7 and 8 from the casing 202 into the subassembly M.

It is obvious that the described embodiments are only examples and that they could be modified, in particular by the substitution of equivalent techniques, without thereby departing from the scope of the invention.

We claim:

1. Portable electronic device for validating participation of an individual in a plurality of operations each involving the input in said device under the command of said individual of at least one encoded datum brought to the knowledge of said individual by at least one information medium, comprising:
    data processing means;
    memory means;
    at least one input interface for applying said encoded datum supplied by said information medium to said data processing means;
    said data processing means comprising:
        means for decoding said encoded datum;

means for extracting a variable numerical value from said decoded datum;

means for comparing said extracted variable numerical value with at least one previously stored variable numerical value and for producing a first output if said extracted variable numerical value exhibits a predetermined relationship with said at least one previously stored variable numerical value and a second output if said extracted variable numerical value does not exhibit said predetermined relationship with said at least one previously stored variable numerical value;

means for conditionally validating said participation based on at least one condition comprising the issuance of said second output by said means for comparing, said validating means:

prohibiting validation of said participation in response to said first output, and validating said participation and storing said extracted variable numerical value in said memory means if said at least one condition is fulfilled;

said memory means being inaccessible from said input interface and being controlled by said data processing means to store, over a period of time, information representative of said at least one previously stored variable numerical value; and an output interface to produce an output code representative of participations validated by said data processing means; and means for supplying electrical power to said data processing means and said memory means.

2. Device according to claim 1, wherein said decoded datum further comprises a dating datum and wherein said extracting means extracts said dating datum from said encoded datum, said validating means prohibits validation of said participation if said extracted dating datum is representative of a date prior to a reference date contained in said memory means, and wherein said data processing means changes said reference date in response to an updating datum and deletes from said memory means, at each change of said reference date, said information representative of said at least one previously stored variable numerical value.

3. Device according to claim 2, wherein said validating means stores said extracted dating datum with said extracted variable numerical value in said memory means if said at least one condition is fulfilled and said extracted dating datum is identical to or represents a date later than said reference date and wherein said reference date is constituted by a most recent dating datum stored in said memory means with a previously stored variable numerical value.

4. Device according to claim 3, wherein said extracted variable numerical value is an order number, and wherein said validating means validates said participation if said at least one condition is fulfilled and if, in case said extracted dating datum and said reference date are identical, said extracted order number and said last order number stored are within limits imposed by values representing an order relationship stored in said memory means.

5. Device according to claim 2, wherein said device comprises a clock coupled to said data processing means in order to supply an absolute date constituting said reference date, said data processing means authorizing said comparison of said extracted variable numerical value with said at least one previously stored variable numerical value when there is coincidence between said extracted dating datum and said absolute reference date.

6. Device according to claim 5, wherein said memory means comprises at least one memory unit forming a table having a plurality of memory locations, said plurality of memory locations having numerical values as addresses, said extracted variable numerical value being equal to one of said address numerical values and being stored as an item of information in one of said memory locations having as address said one address numerical value equal to said extracted variable numerical value.

7. Device according to claim 5, wherein said memory means comprises a plurality of memory units which are selectively addressable by said data processing means of processing as a function of a degree of resolution of said extracted dating datum.

8. Device according to claim 5, wherein said memory means comprises a plurality of memory units selectively addressable by said data processing means as a function of an order datum contained in said encoded datum and representative of a presence or absence of a condition relating to an order of entry of said encoded datum.

9. Device according to claim 8, wherein said memory means comprises at least a first memory unit whose memory locations are directly addressable in response to a detection of an order datum representative of an absence of said condition relating to an order of entry of said encoded datum, and at least one second memory unit addressable according to a predetermined addressing sequence in response to the detection of an order datum representative of said condition relating to an order of entry of said encoded datum.

10. Device according to claim 9, wherein said second memory unit is a register.

11. Device according to claim 5, wherein said memory means comprises a plurality of memory units selectively addressable by said data processing means as a function of a medium type datum of said encoded datum which is representative of the type of said medium carrying said encoded datum.

12. Device according to claim 1, further comprising a remote control unit contained in said casing for selectively remotely controlling gaining of access to a television screen as said information medium.

13. A device according to claim 1, wherein said memory means comprises storage means for storing at least one winnings datum issued by said data processing means as a result of a validated participation.

14. Device according to claim 12, wherein said storage means comprises at least one winnings counter which is incremented at each validation of a participation.

15. Device according to claim 14, wherein said data processing means increments said winnings counter by a quantity depending on a winnings datum contained in said encoded datum.

16. Device according to claim 14, wherein said data processing means increments said winnings counter by a quantity which is calculated according to a predetermined law stored in said memory, as a function of at least one winnings datum contained in said encoded datum and/or stored temporarily or permanently in said memory means.

17. Device according to claim 12, wherein said data processing means comprises means for debiting and authenticating winnings stored in said storage means in response to participations validated by said validating means, said debiting and authenticating means supplying a composite output code by encoding, according to a first given algorithm as a function of an item of control information comprising a random number supplied from an authorized organization, said debited winnings, said reference date and unique identification code stored in said memory means, said authorized organization including means of computation for carrying out, using said random number, according to a second algorithm correlated with said first algorithm, a computation on said composite output code in order to decode said winnings and to compute an external identification code, said winnings being authenticated when there is consistency between said external identification code and an item of check information known to said authorized organization, provided that said reference date is valid.

18. Device according to claim 17, wherein said storage means comprises at least one winnings counter which is incremented at each validation of a participation, wherein said item of control information comprises an amount of said winnings that said user wishes to have debited from said winnings counter, and wherein said data processing means comprises means for comparing said winnings stored in said winnings counter with said amount to be debited and for decrementing said winnings counter as a function of the result of said comparison.

19. Device according to claim 18, wherein said storage means comprises a plurality of said winnings counters selectively incremented in response to said validation of a participation as a function of a medium type datum of said encoded datum which is representative of the type of said medium carrying said encoded datum, and wherein said item of control information comprises a counter identification datum, said winnings being debited from one of said plurality of winnings counters identified by said counter identification datum.

20. Device according to claim 17, wherein said data processing means comprises means for inhibiting said validating means in response to a delivery of said composite output code, and for making said validating means operational, and for debiting said winnings from said storage means in response to an entry of an enabling code supplied by said authorized organization when said winnings are authenticated.

21. Device according to claim 1, wherein said data processing means comprises means for error checking and/or consistency checking in order to check said encoded datum as a function of at least one check code contained in said encoded datum.

22. Device according to claim 1, wherein said data processing means comprises means for processing, according to a predetermined rule, as a function of at least one secret datum stored in said memory means, a random datum entered, and for storing an item of information representative of a result of said processing, said validating means conditionally validating said participation based on a second condition comprising said result of said processing.

23. Device according to claim 1, wherein said input interface comprises a keypad.

24. Device according to claim 1, wherein said input interface comprises optical means for reading information from a display screen.

25. Device according to claim 1, wherein said input interface comprises means for reading a bar code.

26. Device according to claim 1, wherein said output interface comprises a display screen.

27. Device according to claim 1, wherein said data processing means is a programmed microcomputer.

28. Device according to claim 1, further comprising a casing and a removable subassembly which includes said memory means and a means for connecting said subassembly to said casing.

29. Device according to claim 28, wherein said data processing means is at least partly installed in said removable subassembly.

30. Device according to claim 28, wherein said removable subassembly is constituted by a microcircuit card.

31. Portable electronic device for validating participation of an individual in a plurality of operations each involving the input in said device under the command of said individual of at least one encoded datum brought to the knowledge of said individual by at least one information medium, said encoded datum comprising at least one dating datum, said device comprising:
    data processing means;
    memory means;
    a clock for supplying an absolute reference date to said data processing means;
    at least one input interface for applying said encoded datum supplied by said information medium to said data processing means;
    said data processing means comprising:
        means for decoding said encoded datum;
        means for extracting said dating datum from said decoded datum;
        means for comparing said extracted dating datum with said absolute reference date and for producing a first output if said extracted dating datum exhibits a predetermined relationship with said absolute reference date and a second output if said dating datum does not exhibit said predetermined relationship with said absolute reference date;
        means for conditionally validating said participation based on at least one condition comprising the issuance of said first output by said means for comparing, said validating means;
    prohibiting validation of said participation in response to said second output; and,
    validating said participation and storing in said memory means a data representative of said validation if said at least one condition if fulfilled;
    said memory means being inaccessible from said input interface; and
    an output interface to produce an output code representative of participations validated by said data processing means; and
    means for supplying electrical power to said data processing means and said memory means.

32. Device according to claim 31, wherein said comparing means produce said first output when there is coincidence between said extracted dating datum and said absolute reference date and said second output when there is no coincidence between said extracted dating datum and said absolute reference date.

* * * * *

UNITED STATES PATENT AND TRADEMARK OFFICE
CERTIFICATE OF CORRECTION

PATENT NO. : 5,297,205
DATED : March 22, 1994
INVENTOR(S) : Yves AUDEBERT et al

It is certified that error appears in the above-indentified patent and that said Letters Patent is hereby corrected as shown below:

Column 16, lines 49 and 64, claims 14 and 17, "claim 12" should read --claim 13--

Signed and Sealed this

Twenty-third Day of August, 1994

Attest:

BRUCE LEHMAN

Attesting Officer

Commissioner of Patents and Trademarks